Patented Aug. 15, 1950

2,519,249

UNITED STATES PATENT OFFICE 2,519,249

CARBOXYETHYL CELLULOSE ETHERS

William M. Hutchinson, Bartlesville, Okla., assignor to Phillips Petroleum Company, a corporation of Delaware No Drawing. Application February 17, 1947,
Serial No. 729,199

8 Claims. (Cl. 260—231)

This invention relates to the production of carboxyethyl cellulose ether. In one of its more specific aspects it relates to a method for the preparation of pure and water soluble carboxyethyl cellulose ether.

An object of my invention is to provide a method for the production of carboxyethyl cellulose ether in a high degree of purity.

Another object of my invention is to provide a method for the production of water soluble carboxyethyl cellulose ether in a high degree of purity.

Still another object of my invention is to provide a method for the production of water soluble alkali metal salts of carboxyethyl cellulose ether in a high degree of purity.

Still other objects and advantages will be apparent to those skilled in the art from a careful study of the following disclosure.

It has been shown by investigation in this field that cellulose has the empirical formula $(C_6H_{10}O_5)_n$ and may be represented by:

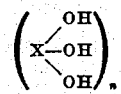

in which X represents the cellulose residue, $C_6H_7O_2$.

Carboxyethyl cellulose ether is a derivative of cellulose in which a hydroxyl hydrogen has been substituted by a carboxyethyl group and has the following formula:

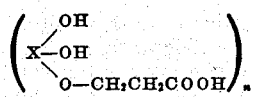

in which X represents the cellulose residue $C_6H_7O_2$. The degree of this substitution may vary from that of a single hydroxyl group on one glucose unit, or one or more hydroxyls on each of two or more glucose units to that of all three hydroxyl groups on each of the glucose units. Carboxyethyl groups have a solubilizing effect on the previously insoluble cellulose molecule, thus making this very abundant material available for numerous valuable applications.

Heretofore carboxyethyl cellulose ether has been prepared by the interaction of cellulose with acrylonitrile. The prior art carried out the reaction in an alkaline medium, preferably at about room temperature and with vigorous agitation. By operating under these prior art conditions viscous solutions of carboxyethyl cellulose ether were obtained, the degree of substitution being variable according to the proportions of the reactants, conditions of operation and the like. While such methods of preparation have certain advantages, the product is usually contaminated with such water soluble impurities as B,B'-dicarboxydiethyl ether, the removal of which is extremely difficult. The presence of such impurities often renders the product undesirable and, in some instances, substantially unfit for many uses.

I have now discovered a process for the production of carboxyethyl cellulose ether wherein the product is substantially free from contaminating impurities. According to the process of my invention cellulose is reacted with acrylonitrile in an alkaline medium under conditions such that cyanoethyl cellulose ether forms as a curd-like precipitate in an intermediate stage. This precipitate is separated from the aqueous mother liquors thereby leaving the major portion of the water soluble impurities behind. After washing to remove additional impurities, the intermediate cyanoethyl cellulose ether is hydrolyzed to carboxyethyl cellulose ether by treatment with aqueous alkali.

It would appear that in the presence of the alkaline solution, hydrolysis of the cyanoethyl cellulose would proceed at a rate such that substantial amounts of carboxyethyl cellulose ether would be found and would remain in the aqueous phase when separation of the precipitate is effected. In processes heretofore disclosed such hydrolysis usually does occur to a degree such that precipitation of cyanoethyl cellulose ether is often limited to a mere turbidity of the solutions or at most a solvated gelatinous mass. However I have found that when operating at a sufficiently low temperature and when agitation of the system is maintained only intermittently and to a degree sufficient only to secure adequate contacting of the reactants a substantially quantitative precipitation of cyanoethyl cellulose ether is effected. This intermediate product is in the form of tough white crumbs which can be readily separated and washed. Subsequent treatment of the washed crumbs with aqueous alkali yields a highly purified carboxyethyl cellulose ether.

The cellulose employed as starting material may be cotton, regenerated cellulose, cellulose obtained from wood, flax, or other plant stems prepared by well known processes. I have generally preferred to digest the cellulose in an alkaline solution at about 100° C. for, say, 30 minutes after which digestion the mixture is cooled to 0° C. and allowed to stand for about 12 to 24 hours. By operating in this manner the cellulose is swollen thoroughly before treatment with acrylonitrile.

The alkali employed may be any strongly basic, water soluble hydroxide such as those of the alkali metals. Quaternary ammonium hydroxides are also applicable to the process if desired.

While the aqueous alkali solution may vary in concentration from about five to about thirty per cent, I have generally preferred to operate with concentrations from about seven to about fifteen per cent. A convenient proportion comprises ten to fifteen parts by weight of ten per cent alkali solution for each part of cellulose.

After the cellulose has been digested and swollen in the alkaline solution, acrylonitrile is added and the mixture stirred sufficiently to secure thorough contacting of reactants. The amount of acrylonitrile employed will be from 0.5 to three parts by weight per part of cellulose. The minimum amount of alkali employed to digest the cellulose should preferably be equivalent to the amount of acrylonitrile used on a mol basis. The system is maintained at a temperature of from −20 to +10° C., preferably from −5 to +5° C., for a period of from 1.5 to 24 hours with intermittent mild stirring, say about once each half hour. White curds or crumbs of cyanoethyl cellulose ether begin to form in from one to twenty hours depending on the temperature. When no further precipitation is noted the reaction mixture is filtered to separate the crumb which is then washed with water at a temperature between about 10° C. and 0° C. or preferably under +5° C. Then, if desired, it may be further washed with ethanol at a temperature between the limits of −20° C. and +10° C. After washing, the cyanoethyl cellulose ether is placed in a ten per cent solution of alkali and hydrolyzed until a homogeneous solution is obtained. The amount of alkali solution employed for the hydrolysis will correspond approximately with that used in the original reaction mixture. Hydrolysis can be more readily effected at temperatures between 20 and 40° C., although temperatures outside these limits may be employed in some instances.

For most uses the product can be utilized in solution, either in the presence of the alkali or in a neutral or acid state established by adding a suitable amount of acid. It is an advantage of the carboxyethyl cellulose ether solutions prepared in this manner that the degree of substitution is maintained at a level sufficiently low to prevent precipitation, either by alkali metal salts formed in the neutralization of the hydrolyzed solution or by heavy metal salts. On the other hand the degree of substitution is sufficiently high to impart the desired solubilizing effect.

Should it be desirable to isolate the carboxyethyl cellulose ether, the solution may be neutralized with acid and the product precipitated by addition of a water miscible organic liquid such as methanol, ethanol, or acetone, in which it is insoluble. The precipitated product is then removed by filtration, washed with alcohol, and dried.

Example I

Ten grams of mercerized and degraded cotton linters was placed in 120 ml. of ten per cent sodium hydroxide solution and digested for 30 minutes at 100° C. The mixture was then cooled to 0° C. and allowed to stand for 16 hours to swell the cellulose. Ten grams of freshly distilled acrylonitrile was then added and the mixture stirred manually for about one minute. The temperature was held at 0° C. for eight hours with a brief period of manual stirring each half hour. Insoluble curds of cyanoethyl cellulose ether which were formed were removed on a filter and washed with distilled water at 0° C., then with alcohol at the same temperature. The washed curds were then transferred to a beaker and hydrolyzed in 120 ml. of ten per cent sodium hydroxide at a temperature of 30° C. until a homogeneous solution was formed. The product was precipitated with ethanol and found to be substantially free from impurities. The precipitated ether may be ground to any particle size desired.

Example II

The experiment of Example I was repeated using the same materials, proportions, and conditions but hydrolyzing the cyanoethyl cellulose ether in the original solution without separation. Upon precipitation and isolation the carboxyethyl cellulose ether was found to contain 13 per cent impurities based on β,β′-dicarboxydiethyl ether.

Example III

The experiment of Example I was repeated using similar materials and proportions. The reaction temperature was held at 5° C. for eight hours during which time the mixture was continuously agitated with a mechanical stirrer. No curds of cyanoethyl cellulose ether were formed. By this experiment it was demonstrated that under the conditions maintained cyanoethyl cellulose ether does not form as a separable precipitate.

Example IV

The experiment of Example I was repeated using substantially identical conditions other than that stirring was effected manually for a brief interval each half hour. In about 3.5 hours cyanoethyl cellulose ether curds had separated in large amounts. By this experiment it was demonstrated that under the conditions maintained precipitation of cyanoethyl cellulose ether can be effected by reducing agitation of the system to a minimum.

Example V

The experiment of Example IV was repeated using the same reactants and proportions. The temperature was held at 25° C. with stirring at half hour intervals. After 1.5 hours a slight turbidity was noted but no curds were formed even after several hours. This experiment demonstrates that at the temperature maintained cyanoethyl cellulose ether does not precipitate in separable form.

Example VI

The experiment of Example I was repeated using the same reactants, proportions and conditions. When the cyanoethyl cellulose ether had precipitated the solution was divided into two portions in each of which a corresponding portion of the cyanoethyl cellulose ether was allowed to remain. One portion was stored in a refrigerator at a temperature of 0° C. The other was allowed to stand at room temperature. The curds in the refrigerated sample showed substantially no hydrolysis after standing two days while those at room temperature were completely hydrolyzed to carboxyethyl cellulose ether at the end of four hours.

It is believed that the reaction of the cellulose with the acrylonitrile to form cyanoethyl cellulose ether is:

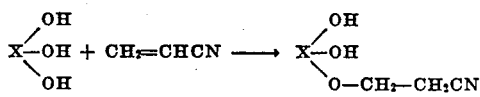

wherein X represents a cellulose residue.

The cyanoethyl cellulose ether hydrolysis in the presence of an alkali is believed to be:

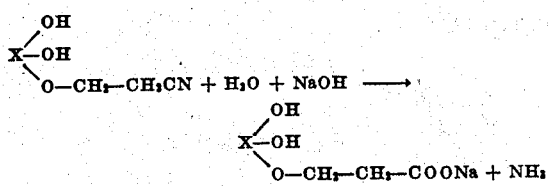

When this hydrolysis reaction is carried out in the presence of KOH or other similar hydroxide the corresponding metal salt is of course formed. This reaction is best carried out at about room temperature, since I have shown hereinbefore that very little of the curdy cyano compound hydrolyzes at temperatures of around 0° C.

In the hereinbefore described experiments, equal weights of cellulose and acrylonitrile were taken as reactants. These materials need not be reacted in equal amounts but may be varied at least to some extent. By variation of the amount of acrylonitrile reacted with a given amount of cellulose, the resulting degree of substitution of the carboxyethyl group in the cellulose units may be varied. With a degree of substitution between 0.34 and 0.75, the resulting sodium carboxyethyl cellulose ether is a white, brittle solid that can be easily reduced to a powder once it has been dried. It is readily soluble or dispersible in water from which it is precipitated by ethanol. When so precipitated, the salt is a soft, gelatinous floc which hardens to an opaque mass when dehydrated with absolute alcohol. The fully dried powder does not deliquesce at commonly encountered humidities and is not noticeably hygroscopic.

As will be realized by those skilled in the art reagent concentrations, ratio of reactants, temperatures and length of time of process steps may be varied within limits and still obtain the final product as herein disclosed, and remain within the intended spirit and scope of my invention. The specific conditions of reactions, times, temperatures, and other variables are given herein by way of example and are not intended to be limiting conditions. My invention is limited only by the following claims.

Having disclosed by invention, I claim:

1. A method for the production of carboxylic ethyl cellulose ethers of low degree of substitution comprising reacting cellulose with acrylonitrile at a temperature below 5° C. in the presence of a strongly alkaline aqueous solution and with intermittent stirring sufficiently mild so as to produce a precipitated cyanoethyl cellulose ether having a degree of substitution of 0.75 and less, separating the precipitate from this alkaline solution, and reacting said precipitate with a second strong alkaline aqueous solution to produce said carboxylic ethyl cellulose ether.

2. A method for the production of an alkali metal salt of carboxylic ethyl cellulose ethers of low degree of substitution comprising reacting cellulose with acrylonitrile at a temperature below 5° C. in the presence of an alkali metal hydroxide solution and with intermittent stirring sufficiently mild so as to produce a precipitated cyanoethyl cellulose ether having a degree of substitution of 0.75 and less, separating the precipitate from this alkaline solution, and reacting said precipitate with a second aqueous alkali metal hydroxide solution to produce corresponding alkali metal salts of carboxylic ethyl cellulose ethers of said low degree of substitution.

3. The method of claim 2 wherein the second aqueous alkali metal hydroxide solution is an aqueous sodium hydroxide solution.

4. A method for the production of alkali metal salts of carboxylic ethyl cellulose ethers of low degree of substitution comprising the steps of soaking a quantity of cellulose in an aqueous alkali metal hydroxide solution for a period of time sufficient to cause the cellulose to swell, adding a quantity of acrylonitrile equal in weight to the weight of the cellulose to the alkaline solution containing the cellulose at a temperature below 5° C., stirring the mixture at intervals of half an hour over a period of from one and one-half to twenty four hours so as to produce a precipitated cyanoethyl cellulose ether having a degree of substitution between the limits of 0.34 and 0.75, separating the precipitate from the cold alkaline solution, washing the precipitate with water below 5° C., further washing the precipitate with ethanol at a temperature below 5° C., and reacting the washed precipitate with a second aqueous solution of an alkali metal hydroxide to form an alkali metal salt of carboxylic ethyl cellulose ethers having a degree of substitution between the limits of 0.34 and 0.75.

5. The method of claim 4 wherein the alkali metal hydroxides are sodium hydroxide.

6. In a method for producing alkali salts of carboxylic ethyl cellulose ethers wherein cellulose is reacted with acrylonitrile in the presence of an aqueous alkali metal hydroxide and the reaction product therefrom is hydrolyzed to form said alkali metal salts of carboxylic ethyl cellulose ethers, the improvement comprising carrying out the reaction between the acrylonitrile and cellulose in the alkaline solution at a temperature below 5° C., stirring the mixture at about half hour intervals over a period of from one and one-half to twenty-four hours, said stirring being sufficiently mild so as to produce an intermediate cyanoethyl cellulose ether precipitate of degree of substitution between the limits of 0.34 and 0.75, and separating this precipitate from its mother liquor prior to the hydrolysis step.

7. The method of claim 4 wherein the acrylonitrile-cellulose-alkaline solution mixture is maintained at a temperature between the limits of −20° C. to +10° C. during the stirring period, and the separated precipitate is washed with water at a temperature between +10° C. and the freezing point of the water, and with the ethanol between the temperature limits of −20° C. to +10° C.

8. The method of claim 4 wherein ethanol is added to the finally produced alkali metal salts of carboxylic ethyl cellulose ethers in alkaline solution to precipitate said ethers, and separating the precipitated ethers from the residual liquid as the product of the process of having a degree of substitution between the limits 0.34 and 0.75.

WILLIAM M. HUTCHINSON.

REFERENCES CITED

The following references are of record in the file of this patent:

UNITED STATES PATENTS

| Number | Name | Date |
|---|---|---|
| 2,332,048 | Bock et al. | Oct. 19, 1943 |
| 2,332,049 | Bock | Oct. 19, 1943 |
| 2,349,797 | Bock et al. | May 30, 1944 |

Certificate of Correction

Patent No. 2,519,249 — August 15, 1950

WILLIAM M. HUTCHINSON

It is hereby certified that error appears in the printed specification of the above numbered patent requiring correction as follows:

Column 4, line 30, for "Example I" read *Example III*; column 6, line 9, for "equeous" read *aqueous*; line 62, strike out the word "of", second occurrence; line 63, after "limits" insert *of*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*